Figure 1:
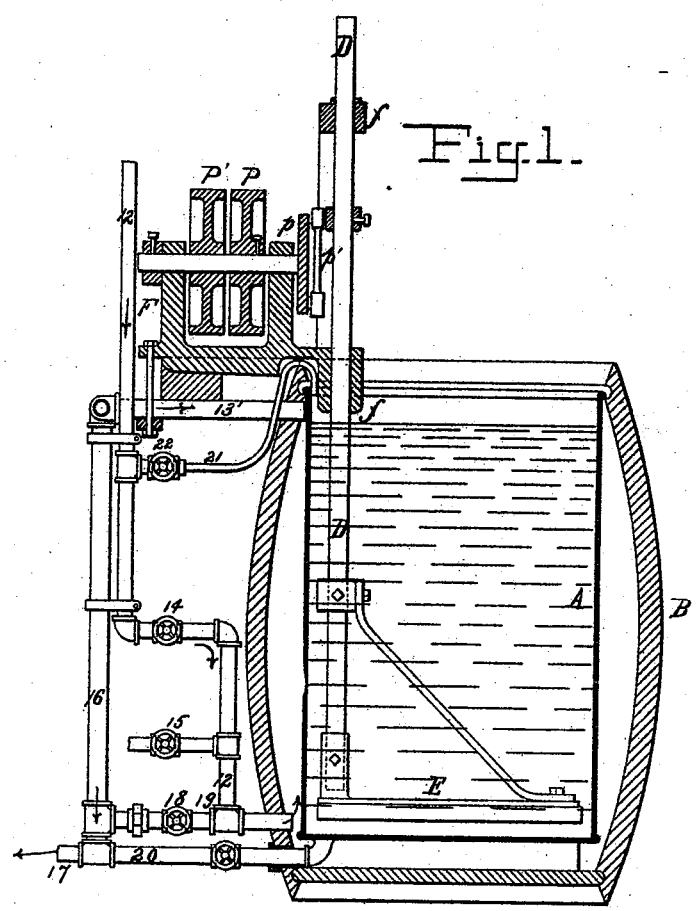

(No Model.)  2 Sheets—Sheet 1.

E. TWEEDY.
APPARATUS FOR HARDENING STEEL.

No. 500,979. Patented July 4, 1893.

WITNESSES:
George Baumann
James Gracie

INVENTOR
Edmund Tweedy
BY Howson and Howson
his ATTORNEYS (No Model.) 2 Sheets—Sheet 2.

E. TWEEDY.
APPARATUS FOR HARDENING STEEL.

No. 500,979. Patented July 4, 1893.

WITNESSES:
George Baumann
James Gracie

INVENTOR
Edmund Tweedy
BY
Howson and Howson
his ATTORNEYS.

UNITED STATES PATENT OFFICE.

EDMUND TWEEDY, OF DANBURY, CONNECTICUT.

APPARATUS FOR HARDENING STEEL.

SPECIFICATION forming part of Letters Patent No. 500,979, dated July 4, 1893.

Application filed January 23, 1892. Serial No. 419,033. (No model.)

*To all whom it may concern:*

Be it known that I, EDMUND TWEEDY, a citizen of the United States of America, and a resident of Danbury, Fairfield county, Connecticut, have invented an Improved Apparatus for the Hardening of Steel, of which the following is a specification.

One object of my invention is to supply convenient and reliable means of causing and maintaining a complete and uniform admixture of compositions used for hardening steel, particularly those compositions of which some or all the ingredients are not soluble in the water, oil or other liquids used, but are held in suspension therein. In hardening steel the hardening effect is produced by the sudden "quenching" of the red hot steel in a fluid of much lower temperature, whereby, it is supposed, the chemical combinations, particularly of the iron and carbon, existing in the steel while in the red hot state are fixed by the sudden cooling. This effect is produced at the instant the red hot steel touches the fluid, when the change of temperature is so great and sudden as to prevent the recombinations which take place if the metal is gradually cooled. A great variety of substances have been used in the hardening bath, which is usually of water or oil, to increase the hardness or toughness of the steel. Some of these substances are soluble and some insoluble, and, in some instances, compounds composed of both soluble and insoluble substances are employed. When insoluble substances are thus employed, they are held in suspension in the water or other liquid when mixed therewith, and when their gravity is greater than that of the liquid, which is usually the case, they will gradually sink to the bottom of the receptacle in which the hardening bath is contained if the fluid is allowed to remain at rest. It is manifest that if these insoluble substances are to produce their proper effect upon the steel in the act of hardening, they must be brought into contact with it at the instant of the sudden "quenching,"—that is to say, they must be at the surface of the bath when the red hot steel is plunged therein; otherwise the effect produced will be only that due to the action of the liquid and such substances as may be dissolved therein. In order to produce uniform results in hardening from the use of such substances or compounds, it is necessary to keep the mixture of which the hardening bath is composed uniform. In practice it has been found that it is not safe to rely upon stirring or agitating the bath by hand, as the carelessness or neglect of the workman will cause great change in the condition of the bath and consequently great want of uniformity in the hardening effect. My invention removes this danger and insures the best and most uniform results by constantly maintaining the hardening bath in the state of highest efficiency,—that is to say, by causing and maintaining a thorough mixture of the materials of which the bath is composed, particularly at the surface of the same.

By my invention I furthermore secure and maintain a thorough admixture of the contents of the bath without undue agitation of the surface of the bath, which is an important consideration, more particularly in that class of hardening work where only a portion of the article has to be hardened.

Another useful effect designed to be accomplished by my invention is the removal of the steam which is produced when the red hot steel is plunged into the hardening bath, and which surrounds the article to be hardened like an envelope, and prevents its proper contact with the hardening fluid. This removal is effected by the constant motion of the fluid produced by my apparatus, which brushes the steam away from the surface of the article plunged into the bath, and, at the same time, brings a fresh supply of cooler fluid into contact with the article being hardened, thus facilitating the cooling operation, and permitting the article to receive the full effect of intimate contact with the fluid.

Another object of my invention is to provide convenient and reliable means for controlling and regulating the temperature of the hardening bath. In order to obtain a uniform degree of hardness upon several articles of the same kind, it is necessary that they should be heated to a uniform temperature and plunged into a hardening bath of uniform temperature, the degree of hardness attained being affected by the rapidity of cooling. Generally speaking, the greater the difference between the temperature of the heated article and that of the bath, the greater will be the degree of hardness attained, and, as a rule, also, the harder an article is made by the process, the more brittle it becomes.

It is obvious that in the manufacture of tools and other articles of steel, it is very desirable that uniformity as respects hardness in articles of the same kind should be obtained, and this cannot be secured, unless a uniform temperature can be maintained in the hardening bath. In a bath composed of different ingredients the proportions of which it is desirable to preserve, this uniform temperature cannot be maintained under ordinary conditions for the temperature of the bath will constantly rise as the articles of red hot steel are plunged therein, and the effects produced will constantly vary. By my invention the temperature of the bath can be controlled and regulated to a nicety. In the hardening of different articles for different purposes where different degrees of hardness are required, it has been found desirable to use hardening baths of different temperatures to produce the required effect in each case, and my invention is very useful in such cases, for by it any required temperature from one slightly above that of the running water employed up to about 200° Fahrenheit can be maintained in the hardening bath.

Figure 2:
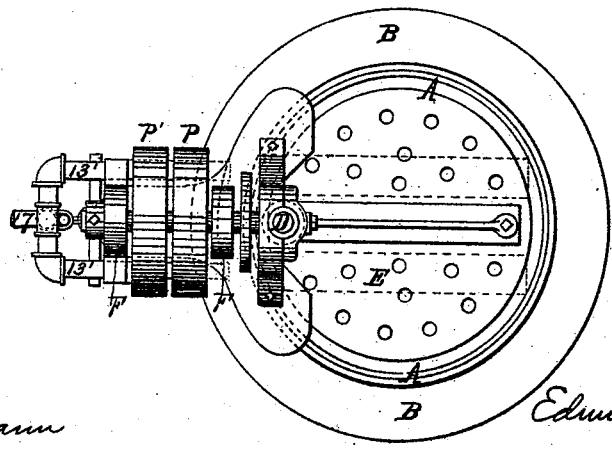
Figure 3:
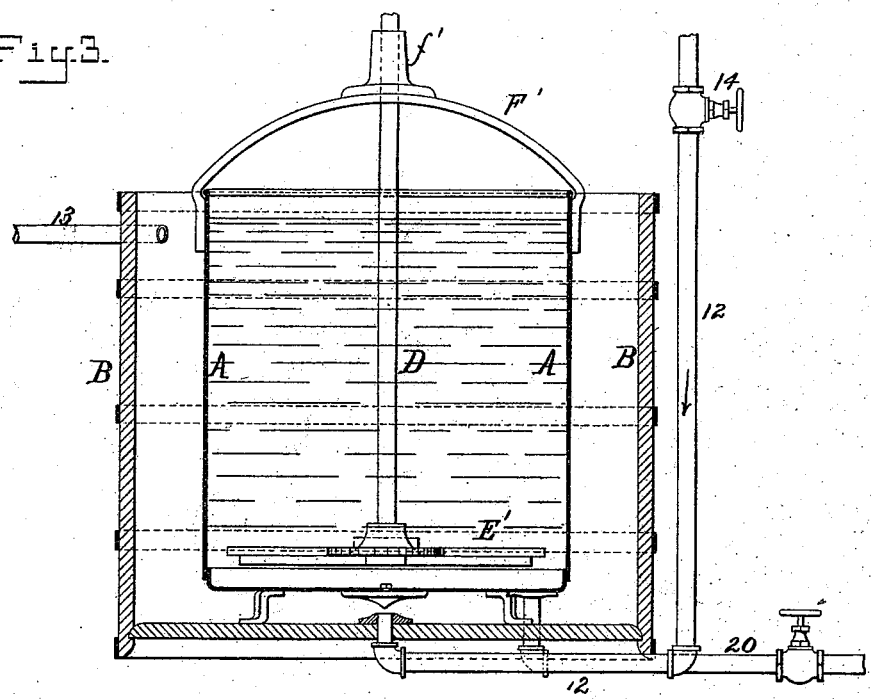
Figure 4:
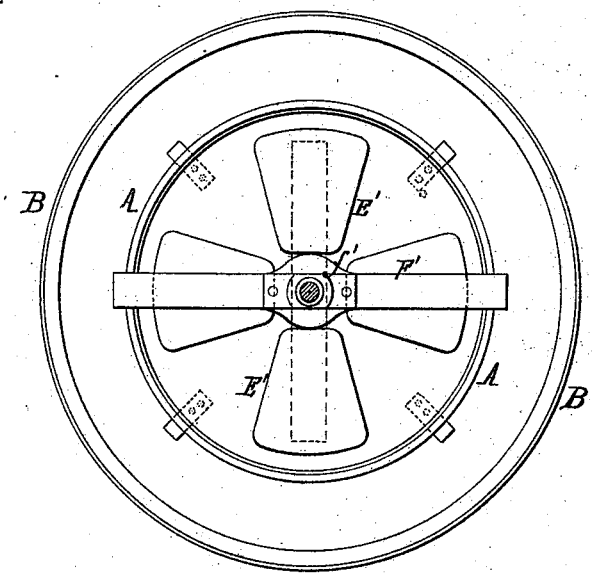

In the accompanying drawings, Figure 1 is a vertical section of one form of my improved apparatus. Fig. 2 is a plan view of the same. Fig. 3 is a vertical section of a modification; and Fig. 4 is a plan view of the same.

The vessel for containing the hardening liquid may be of any suitable size and shape but for convenience it is best to make it cylindrical. I prefer to make it of two tanks A and B, one placed within the other, and in such case it is best to make the inner one of metal and the outer one of wood, leaving a space or jacket between the two for the flow of water or other suitable liquid to regulate and control the temperature of the bath. It is desirable to admit this liquid near the bottom of the outer tank and let it flow off through a pipe near the top. In the simpler arrangement of piping shown in Fig. 3, 12 is the valved supply pipe for the water and 13 is the outlet or overflow. In Figs. 1 and 3, the pipe 12 has a valve 14 to regulate or admit or shut off the supply of liquid to the jacket about the tank. In the construction shown in Figs. 1 and 2, the overflow or outlet from the jacket is shown as formed of two branches 13' connected with a common outlet pipe 16 and discharge 17. The water may be run off from the jacket when desired by opening the cock 18 in a connecting branch 19 between the discharge and the inlet pipes.

By the construction described the hardening bath can readily be maintained at the uniform temperature desired, as above explained, and this may be regulated by controlling the temperature of the water in the jacket. For this purpose, steam may be admitted to the jacket, as for instance by means of a valved steam branch 15 to the water inlet pipe 12, Fig. 1.

The contents of the hardening tank A may be drawn off when desired by opening the cock in a branch 20 leading from the bottom of the tank, either to the same discharge 17 (Fig. 1) or elsewhere (Fig. 3).

A branch 21 having a cock 22 may be employed to renew the supply of water to the inner tank when needed.

To provide for the uniform mixing of the contents of the bath, as before explained, the inner tank A, which contains the hardening liquid, is provided with a mechanical device for agitating the liquid, this device being submerged in all its different operative positions, so as to disturb as little as may be the surface of the liquid, while keeping the contents of the tank constantly and uniformly mixed. The device I use is a vertically reciprocating dasher or paddle E, which in Figs. 1 and 2 is shown as made in the form of a perforated circular board somewhat smaller in diameter than the tank A. It may however be made in various forms. For instance, in Figs. 3 and 4, I have shown the paddle E' as made with four radial blades. In either case the paddle is conveniently carried by an upright stem D, which is suitably guided at the upper part of the tank. In Figs. 1 and 2 it is shown as guided in bearings $f$ carried by a frame F mounted partly on the edge of the tank and partly on the piping 13'. In Fig. 3 the stem D is illustrated as guided in a bearing $f'$ in a cross piece F'.

Means for automatically reciprocating the paddle or dasher are preferably provided as shown in Figs. 1 and 2, and these may conveniently consist of fast and loose pulleys P P' on the shaft of a crank $p$ connected through a rod or link $p'$ to the stem D. I do not however wish to restrict myself to any specific form of operating means for the reciprocating dasher or paddle, as they, as well as the details of construction of the other parts may be variously modified.

I am aware that hardening apparatus has been provided with means for stirring the liquid. This I do not claim, but

I claim as my invention—

1. A hardening tank having an upright stem carrying at its lower end a dasher or paddle, and means for vertically reciprocating the same, the said dasher or paddle being arranged to reciprocate freely within the liquid in the lower portion of said tank, substantially as described.

2. A hardening tank having an upright stem carrying at its lower end a dasher or paddle, and means for freely reciprocating the same within the liquid in the lower portion of the tank said tank having a jacket whereby the temperature of the tank may be controlled, substantially as described.

In testimony whereof I have signed my name to this specification in the presence of two subscribing witnesses.

EDMUND TWEEDY.

Witnesses:
ALBERT POPKINS,
HUBERT HOWSON.